Nov. 2, 1971          H. C. MUN          3,616,560
BEAN SPROUT GROWING MACHINE
Filed Sept. 12, 1969                    3 Sheets-Sheet 1
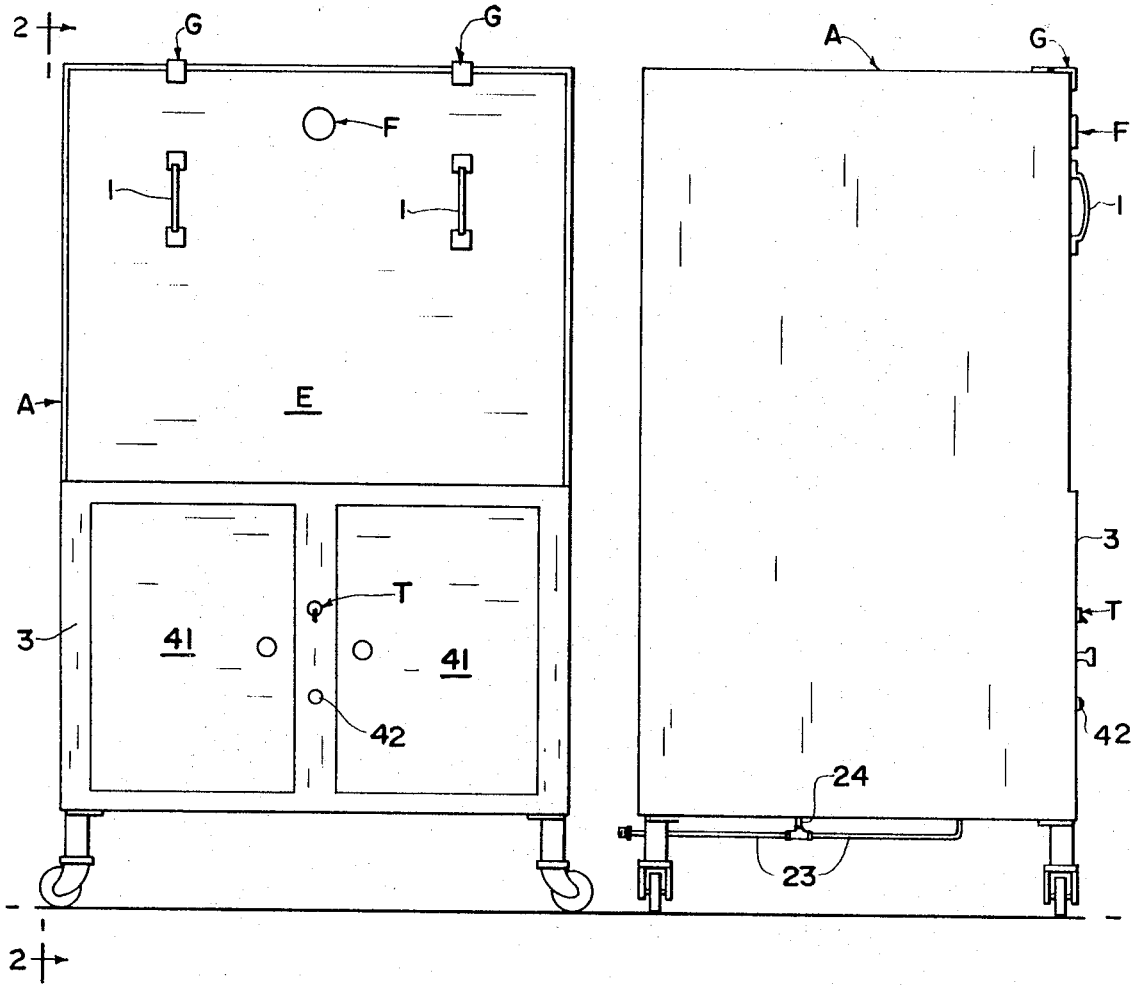
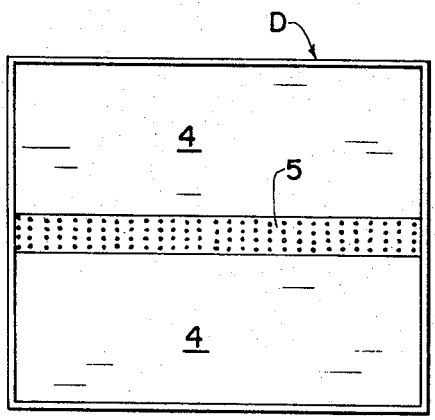
INVENTOR.
HENRY C. MUN
BY Alexander Riaboff
ATTORNEY Nov. 2, 1971  H. C. MUN  3,616,560

BEAN SPROUT GROWING MACHINE

Filed Sept. 12, 1969  3 Sheets-Sheet 2

INVENTOR.
HENRY C. MUN
BY Alexander Riaboff

ATTORNEY

United States Patent Office 3,616,560
Patented Nov. 2, 1971

3,616,560
BEAN SPROUT GROWING MACHINE
Henry C. Mun, 162 7th St., Oakland, Calif. 94607
Filed Sept. 12, 1969, Ser. No. 857,413
Int. Cl. A01g 9/02
U.S. Cl. 47—1.2                3 Claims

ABSTRACT OF THE DISCLOSURE

A bean sprout growing machine in which automatic means is provided for spraying hot water at a predetermined temperature and at predetermined time periods and for a given length of time for each period to cause beans to sprout and grow. Any excess water is immediately drained from the bean sprout growing container and novel means is used for maintaining an unobstructed air passage through the mass of beans from the water drain at the bottom of the container to the top of the compartment so that moist air at a temperature of about 80° F. will constantly fill the container.

BACKGROUND OF THE INVENTION (1) Field of the invention

Bean sprouts can be grown to a proper size from bean seeds in a period of about forty-eight hours if hot water at about 80° F. is sprayed onto the bean seeds for four or five minutes and at time intervals of about one and one-half hours between each spraying. The container for the beans has moist air maintained therein at a temperature of about 80° F. and the bean sprouts will grow to a length of about three and one-half to four inches in length during the growing period of forty-eight hours at which time they are removed from the container.

(2) Description of prior art

The following five patents pertain to the quick sprouting of soybeans for food: Henry H. Hammerstrom et al., No. 2,296,849; Hsiang K. Lee, No. 2,436,652; John Chin, No. 2,750,713, and No. 2,810,988; and Benny N. Chew, No. 2,814,912. None of these patents discloses a bean sprout growing container in which a centrally disposed water drain extends longitudinally along the middle of the container and a bean seed supporting screen covers the bottom of the container and has a central inverted V-shaped portion that overlies the drain. The apex of the V-shaped portion projects above the mass of bean seeds housed within the container and permits the free flow of air between the drain and the interior of the container.

SUMMARY OF THE INVENTION

An object of my invention is to provide a bean sprout growing machine which will at one and one-half hour time intervals automatically spray for a period of four to five minutes a mass of soybean seeds with hot water at a temperature of about 80° F., for causing the seeds to sprout and grow. This is kept up for forty-eight hours at which time the soybean sprouts are about three and one-half to four inches long and can be removed from the machine. One of the novel features of my invention is to immediately drain any excess water from the bean seed sprouting container and to permit air to enter the container through the drain so as to maintain the air within the container at the proper temperature and humidity for the growing of the bean sprouts.

BRIEF DESCRIPTION OF THE DRAWINGS

FIG. 1 is a front elevation of the bean sprout growing machine.

FIG. 2 is an end elevation of the machine when looking in the direction of the arrows 2—2 of FIG. 1.

FIG. 5 is a top view of the soybean sprout growing container.

DESCRIPTION OF THE PREFERRED EMBODIMENT

In carrying out my invention I provide a cabinet A preferably made of stainless steel and illustrated in FIGS. 1 and 2. The cabinet has a lower compartment B and an upper compartment C, see FIGS. 3 and 4. The lower compartment houses the mechanism for supplying hot water at a predetermined temperature to be sprayed into the upper compartment at certain time intervals and for a set period of time at each interval. The upper compartment C houses the soybean sprout growing container D, as shown in FIGS. 3 and 4 and a detailed description of this compartment will be given before describing the mechanism in the lower compartment B.

Figures 3, 6:
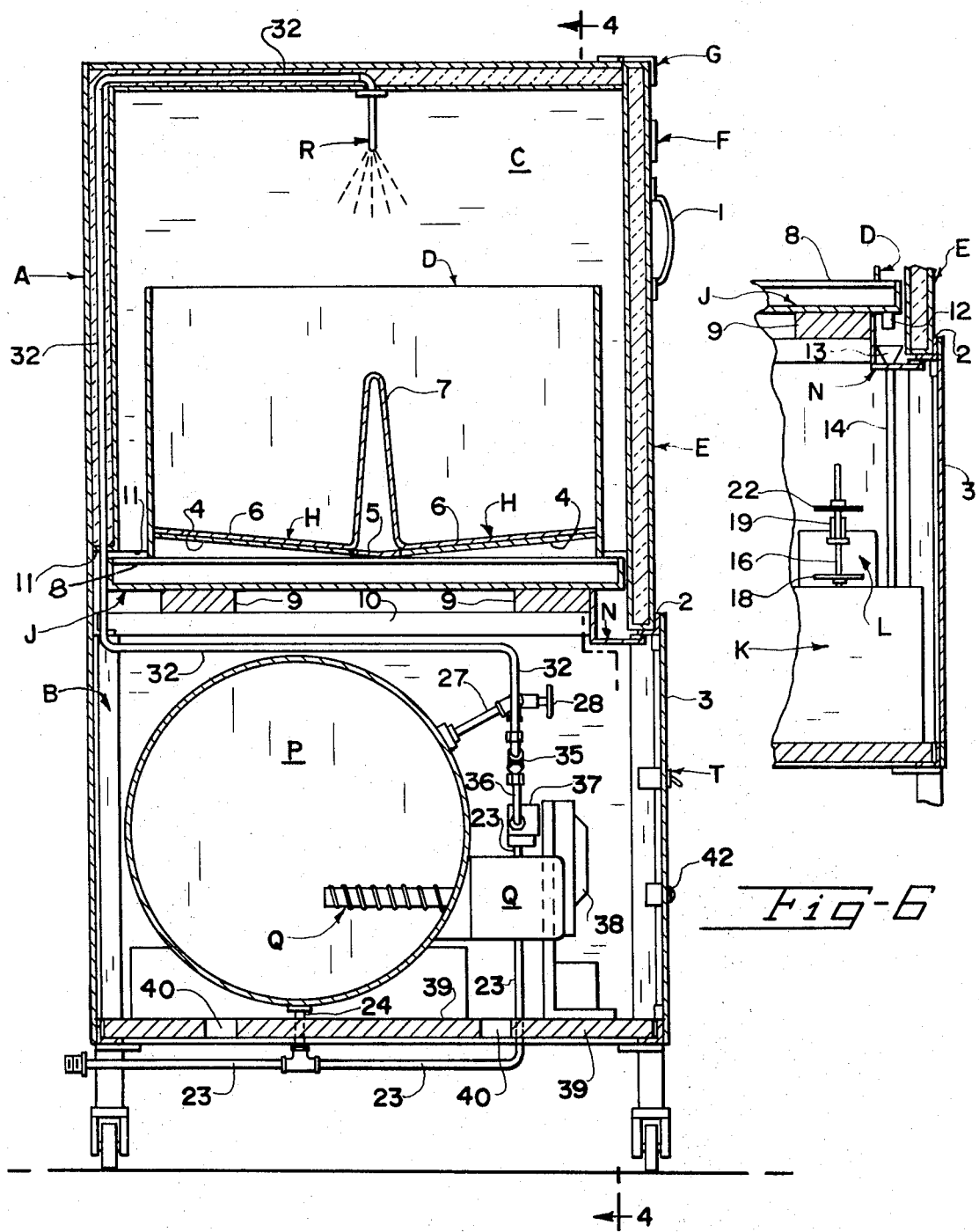
FIG. 3 is a vertical transverse section through the machine.
FIG. 6 is a vertical transverse section through a portion of the machine and is taken along the line 6—6 of FIG. 4.
Figure 4:
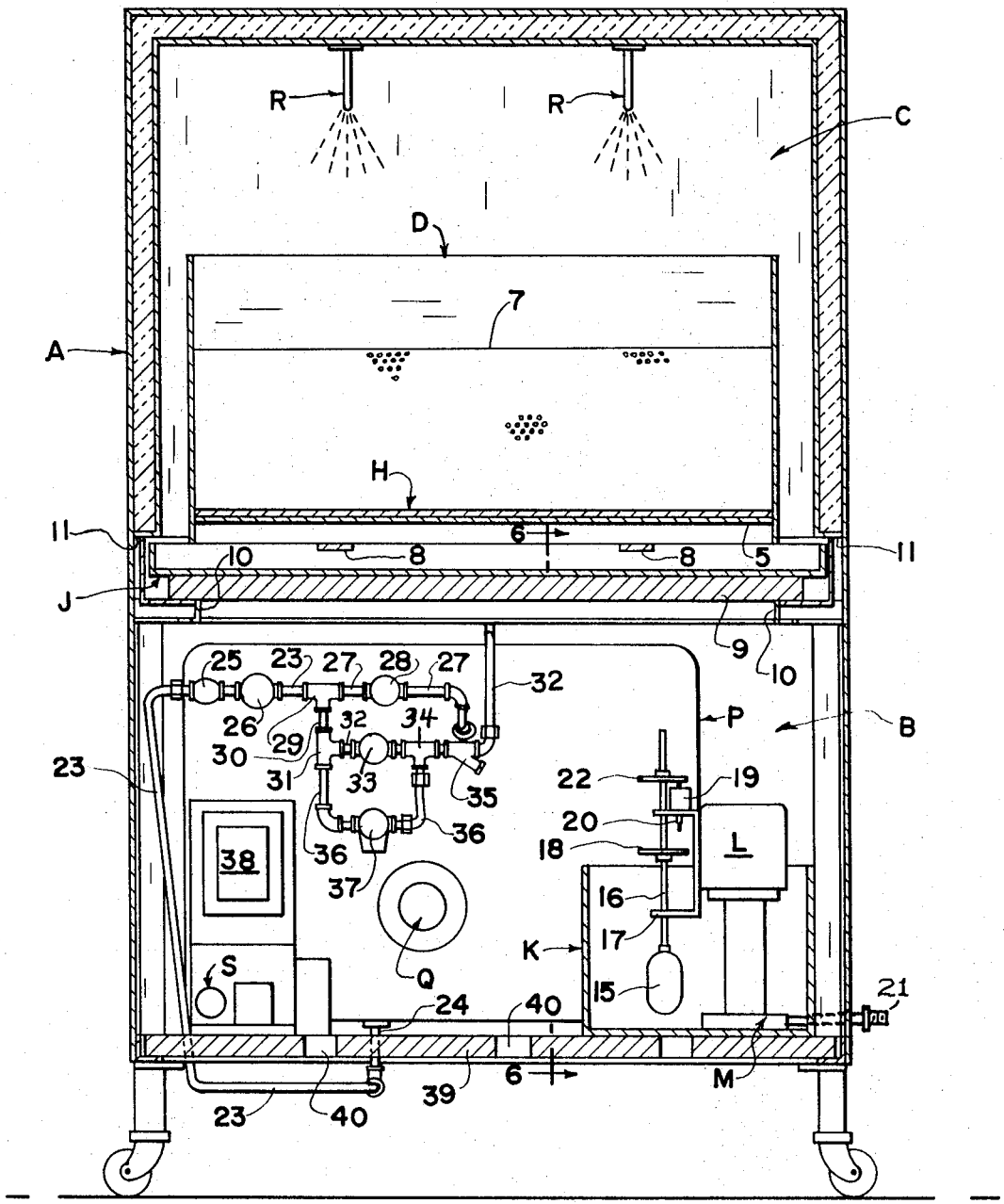
FIG. 4 is a vertical longitudinal section through the machine and is taken along the line 4—4 of FIG. 3.

Referring to FIGS. 1, 3 and 4, it will be noted that the upper compartment C of the cabinet A has insulated walls at its top, back and sides, and a cabinet door E closes the open front of the compartment. The door has handles 1 and a thermometer F for indicating the temperature within the upper compartment C. FIGS. 3 and 6 illustrate how the lower edge of the door E is removably received within a trough-like groove 2 provided at the top of the front wall 3 for the lower compartment B, and FIGS. 1, 2 and 3 show how hinged clasps G can removably hold the top of the door in closed position. The door E is removed when the operator wishes to gain access to the upper compartment for inspection or for removing the bean sprout growing container from the compartment or inserting it back into the compartment.

A top plan view of the soybean sprout growing container D is shown in FIG. 5. The container is rectangular in shape and has an open top. FIG. 3 shows the container as having inclined bottom wall portions 4—4 that extend downwardly at a slight angle from the front and rear walls of the container and terminate at an elongated central perforated drain 5 that extends throughout the length of the container. The container D is preferably made from stainless steel. A stainless steel screen H is inserted in the container and has portions 6—6 overlying the two inclined bottom portions 4—4 of the container and has a central inverted V-shaped and perforated portion 7 that overlies the drain 5 of the container. The screen H supports the soybeans and the inverted V-shaped portion 7 of the screen prevents the beans and/or the growing bean sprouts from clogging the drain 5 of the container D. The purpose of this will be described hereinafter.

FIGS. 3 and 4 show the bottom of the container D removably supported by a pair of straps 8 that extend across the open top of a drain pan J that is positioned under the container for catching any excess water therefrom. The drain pan in turn is removably supported by longitudinally extending, spaced apart and horizontally arranged members 9. FIG. 4 shows the ends of the members 9 supported by brackets 10 that in turn are connected to the walls of the cabinet A. It will be noted from both FIGS. 3 and 4 that the walls of the bean sprout growing container D are spaced inwardly from the adjacent walls of the upper compartment C. Since the walls of the upper compartment are thicker than the walls of the lower compartment B, because they contain insulating material, the lower edges of the insulating walls will form a downwardly facing shoulder 11. This shoulder is positioned just above the top of the drain pan J so as to permit the sides of the pan to extend under the shoulder a distance sufficient to dispose the inner surfaces of the insulated walls within the area defined by the pan sides. Therefore any water of condensation or otherwise that flows down on the inner surfaces of the insulated walls of the upper compartment C will be caught in the drip pan J.

In FIG. 6 I show the drip pan J provided with an outlet 12 that is positioned directly above a funnel 13 for receiving any water issuing from the outlet. The funnel is mounted at the upper end of a drain pipe 14 that conveys the water to a waste water receptacle K. FIG. 4 shows a standard mechanism for automatically pumping water from the receptacle K, as soon as the waste water in the receptacle reaches a predetermined level. An electric motor L is operatively connected to a water pump M. A float 15 moves a rod 16 upwardly as the water level in the receptacle K rises. The rod slides in a bracket 17 and carries a switch-closing disc 18. A mercury switch 19 has a switch-closing member 20 extending downwardly that is adapted to close the switch when contacted by the disc 18 as the float 15 moves the latter upwardly. The switch 19 connects the motor L to a source of electricity, not shown, and the operation of the motor will cause the pump M to operate and force the water in the receptacle K out through an outlet pipe 21. A hose, not shown, may be connected to the outlet pipe 21 for conveying the waste water to a sink, not shown. A second disc 22 is mounted on the rod 16 and this disc will actuate the switch 19 to open it when the float 15 nears the bottom of the receptacle K. In this way any water draining from the drain pan J is conveyed away from the machine.

It will be noted from FIG. 3 that I provide a longitudinally extending trough N that is coextensive with the width of the cabinet door E and has a portion underlying the lower edge of the door. Any water that strikes the inner surface of the door or any condensation of water on this door surface will drain into the trough N rather than flow into the lower cabinet compartment B. FIG. 6 shows the same trough N and the funnel 13 for the drain pipe 14 will have openings positioned near the bottom of the trough for receiving any water from the trough and directing it into the drain pipe 14.

I will now describe the mechanism for spraying hot water into the container D at predetermined time intervals and for a certain time duration at each interval. A cold water inlet pipe 23, see FIG. 3, has a connection at the rear of the machine to which a hose, not shown, may be coupled for conveying city water under pressure to a hot water storage tank P. A branch pipe 24 connects the pipe 23 to the storage tank. A thermostat controlled electric heating element Q extends into the tank and will heat the water in the tank to a temperature of about 160° F. FIGS. 3 and 4 show the cold water inlet pipe 23 extending upwardly and in front of the hot water storage tank P, and provided with a check valve 25 and with a cold water control valve 26. A hot water conveying pipe 27 leads from the hot water tank P and a hot water control valve 28 controls the flow of hot water through this pipe.

The cold water pipe 23 and the hot water pipe 27 meet at a common T-member 29, see FIG. 4, that also connects with a common pipe 30 for receiving the proper mixing of the hot and cold waters to arrive at a temperature of about 80° F., by adjusting the cold water valve 26 and the hot water valve 28. The pipe 30 communicates with another T-member 31, and a valve-controlled water temperature test line 32 leads from the T-member 31 and has a water valve 33 therein. The water line 32 then has another T-member 34 and a water screen 35 for removing any sediment from the water. Both FIGS. 3 and 4 show the pipe 32 extending from the water screen unit 35 in an upward direction and then in a rearward direction so as to clear the hot water storage tank P. At the rear of the lower cabinet compartment B, the water pipe 32 is bent upwardly and extends through the insulation in the rear wall of the upper cabinet compartment C. At the top of the compartment C, the pipe 32 extends forwardly still preferably embedded in the insulation of the cabinet top. At about the center of the cabinet top, the pipe 32 has branches extending to the right and to the left and these feed hot water at a temperature of about 80° F. to two spray nozzles R.

The timing mechanism for controlling the intervals of time between each spraying period and also for controlling the length of time that the spray is operating is illustrated in FIGS. 3 and 4. A parallel pipe line 36 has its ends connected to the two T-members 31 and 34 and a solenoid controlled water valve 37 is mounted in the line and is electrically connected to an electric timer indicated schematically at S. A safety switch, not shown, is housed within a box 38 and both the box and timer S are supported by a base plate 39 that has vent openings 40 therein. The base plate also supports the hot water tank P and the waste water receptacle K. A wiring diagram is not shown. It is sufficient to state, the wiring is such as to cause the motor L and the heating element Q to be connected to the electric current source as soon as the device is connected to an electric outlet box with the proviso that the float-controlled mercury switch 19 actually starts the motor L when the water in the receptacle K rises to a certain height and stops the motor when the water has been pumped from the receptacle. FIGS. 1, 2 and 3 show the front wall 3 for the lower compartment B provided with two hinged doors 41 which may be opened to gain access to the interior of the compartment. The front wall 3 has a central portion that lies between the two doors and a main switch T is carried by this central portion. A pilot light 42 is positioned below the switch T and this light is illuminated when the switch is closed. As soon as the switch T is closed, it connects the timer S to start it operating. The timer is adjusted to close an electric circuit to the solenoid valve 37 every one and one-half hours to open the valve and keep it open for about five minutes after which the current is cut off to the solenoid valve for permitting the valve to close.

OPERATION

From the foregoing description of the various parts of the device, the operation thereof may be readily understood. The cold water inlet pipe 23 is connected to a source of cold water that is under pressure and the waste water outlet pipe 21 is connected to a sewer drain. The machine is also connected to a source of electricity.

The water temperature test valve 33 is opened, see FIG. 4, and also the cold water valve 26 and the hot water valve 28 are opened. As the water storage tank P fills with water, the air trapped in the tank will be forced out through the pipe 27 and will escape through the pipes 30 and 32 and will issue out from the spray nozzles R. When air ceases to escape from the spray nozzles, the operator knows that the tank P is filled with water. The test valve 33 is now closed and the heating element Q will raise the temperature of the water in the tank to about 160° F. This takes about two hours. The test valve 33 is reopened and the hot water from the tank will flow through the pipe 32 and out through the spray nozzles R. Cold water from the pipe 23 will mix with the hot water and the operator adjusts the hot and cold water valves 26 and 28 until the water being sprayed from the nozzles R will have a temperature of about 80° F. In actual practice the machine will be factory adjusted and the cold and hot water valves 26 and 28 will be preset to deliver hot water to the spray nozzles at a temperature of about 80° F. when the hot water in the tank P is about 160° F. The thermostat controlled heating element Q will maintain the tank water at this temperature. However, when testing the temperature of the water issuing from the spray nozzles R, if the water is too hot or too cold, the cold or hot water valves 26 and 28 can be adjusted until the correct temperature is reached. At this time the testing valve 33 is closed.

A desired quantity of soybean seed is placed in the container D and these will rest on the two portions 6 of the screen H. These bean seeds have been previously soaked in lukewarm water for a time period of about eight hours until their hulls are split. The beans are now poured into the bean growing tank D and are spread evenly over the portions 6 of the screen H. The cabinet door E is closed and the master switch T is turned on. The timer S will now close a circuit to the solenoid valve every one and one-half hours to open the valve and permit heated water at the proper temperature to be sprayed from the nozzles R for about five minutes. This intermittent spraying is continued for about forty-eight hours at which time the bean sprouts have grown to about three and one-half to four inches. The tank D can now be removed from the cabinet and the bean sprouts removed from the tank.

The check valve 25 in the pipe line 23 is to prevent any reverse flow of water in the pipe. The heat from the hot water storage tank P will rise and enter the upper compartment C and will aid in maintaining the temperature in the upper compartment at a temperature of about 80° F. which is the same temperature of the hot water that is sprayed from the nozzles R. Some of the heated air will also pass through the central drain 5 of the container D and will then flow upwardly through the inverted V-shaped portion 7 of the screen H and into the upper compartment C to aid in maintaining the proper humidity and temperature therein. Any excess water delivered by the spray nozzles R will drain through the central drain 5 of the container D and will be conveyed to the waste water receptacle K in the manner already described. The central drain 5 therefore performs a double function of draining excess water from the container D and of permitting hot air from the lower compartment B to pass upwardly through the central drain and the inverted V-shaped portion 7 of the screen H and into the container D and finally into the upper compartment C.

The harvested fresh crisp bean sprouts when removed from the container D can be soaked in cold water. An agitation of the bean sprouts will cause the hulls to sink to the bottom and the sprouts are now ready to be served. The bean sprout growing tank D and the screen H are thoroughly washed and the machine is ready to grow another batch of bean sprouts. For every pound of soybean seeds there is harvested about six to six and one-half pounds of bean sprouts. The pair of straps 8 for the drain pan J not only support the container D, see FIG. 4, but they are also used as handles for removing the drain pan from the cabinet A after the container D has been removed.

I claim:

1. In a bean sprout growing device, a cabinet having an upper and a lower compartment
   (a) a hot water storage tank in said lower compartment, the heat given off by said tank being free to enter said upper compartment;
   (b) a cold water inlet under pressure, means for feeding cold water into said tank as needed, and means for heating the water in the tank for maintaining the water at a preselected temperature;
   (c) a hot water conveying pipe leading from said tank to a common T-member and a branch pipe connecting said cold water inlet to said common T-member;
   (d) a plurality of spray nozzles arranged near the top of the upper compartment;
   (e) a third pipe leading from said common T-member to said spray nozzles, a valve in said hot water pipe and a valve in said branch pipe, both valves being adjustable for delivering hot and cold water to said common T-member for mixing the water and delivering hot water at a predetermined temperature to said third pipe for issuing from said spray nozzles;
   (f) a solenoid controlled valve mounted in said third pipe; and
   (g) timing means for causing said solenoid valve to open at predetermined time intervals and to remain open for a predetermined time interval.

2. The combination as set forth in claim 1; and in which
   (a) a valve-controlled bypass pipe leads from said common T-member and connects with said third pipe to circumvent said solenoid valve for permitting an operator to first test the temperature of the hot water issuing from said spray nozzles before shutting off said valve-controlled bypass and permitting said timing means to control said solenoid valve.

3. In a bean sprout growing device;
   (a) a bean sprout growing container rectangular in shape and having an open top;
   (b) the bottom of the container having a central perforated draining portion that extends from end to end of the container, the remaining portions of the bottom that extend laterally from opposite sides of the median perforated draining portion to the adjacent sides of the container being non-perforate and inclined upwardly at a slight angle in order to drain any water to the central perforated portion; and
   (c) a screen having an inverted V-shaped central portion that overlies the central perforated draining portion of the container bottom and that extends from end to end of the container, the remaining portions of the screen extending laterally from the central inverted V-shaped portion and overlying the upwardly inclined portions of the container bottom;
   (d) whereby the inverted V-shaped portion of said screen will prevent any material in said container from clogging the central perforated draining portion and will permit the free flow of air upwardly through the central perforated draining portion and through the inverted V-shaped central portion of the screen and into the container.

References Cited

UNITED STATES PATENTS

| | | | |
|---|---|---|---|
| 2,060,735 | 11/1936 | Krueger | 47—1.2 |
| 2,436,652 | 2/1948 | Lee | 47—1.2 |
| 2,750,713 | 6/1956 | Chin | 47—14 |
| 2,834,153 | 5/1958 | Fearn | 47—34 |
| 2,928,211 | 3/1960 | Martin | 47—1.2 |
| 3,458,951 | 8/1969 | Martin | 47—1.2 |

FOREIGN PATENTS 551,232  10/1956  Belgium.

ROBERT E. BAGWILL, Primary Examiner